June 28, 1966 F. J. TEGETHOFF 3,257,712

MAGNETIC CORE MEMORY WITH SHIFTABLE MOUNTING STRUCTURE

Filed Oct. 13, 1964 2 Sheets-Sheet 1

Inventor
FRANZ JOSEF TEGETHOFF
BY
Silverman & Cass
ATTYS.

MAGNETIC CORE MEMORY WITH SHIFTABLE MOUNTING STRUCTURE

Filed Oct. 13, 1964 2 Sheets-Sheet 2

Inventor
FRANZ JOSEF TEGETHOFF
BY
Silverman & Cass
ATTYS.

United States Patent Office
3,257,712
Patented June 28, 1966

3,257,712
MAGNETIC CORE MEMORY WITH SHIFTABLE MOUNTING STRUCTURE

Franz Josef Tegethoff, Bad Hersfeld, Germany, assignor to Firma Zuse K.G., Bad Hersfeld, Germany
Filed Oct. 13, 1964, Ser. No. 403,568
Claims priority, application Germany, Oct. 25, 1963, Z 10,432
7 Claims. (Cl. 29—203)

This invention relates generally to a mounting structure for a magnetic toroidal core memory, such as a matrix, and more particularly with a shiftable mounting structure that is easily threaded by conventional equipment. Such shiftable mounting structure further functions as a support means for the plurality of cores when the threading operation has been completed, and the matrix has been prepared for installation into an intelligence network.

In conventional magnetic core memory, such as seen in U.S. Patent No. 3,174,214, a plurality of individual toroidal cores are arranged in a predetermined pattern, which pattern is generally a square lattice pattern. Conductors for the magnetic control of such cores are threaded through the centrally located hole thereof and form a weave which supports said core. These conducting wires thus have dual functions, i.e., they are both magnetic control means and core-supporting means.

The magnetic cores referred to comprise ring core elements, also sometimes known as ferrite cores, which are utilized as storage devices in computers. Such ring cores are capable of assuming at least two magnetic states, pursuant to biasing signals, and are used to call up "bits" of information in binary systems of storage. The bits are usually designated in the art as units and zeros, and the notation utilizes the number characters 1 and 0, respectively, for these conditions.

Such elements are commonly arranged in matrices or arrays in rows and columns, with the information wires extending in the column direction and either threading or not threading the cores. The threaded cores represent units and the cores which are not threaded represent zeros. The call-up wires are in the row direction, at right angle to the column direction, and thread all of the cores. Such matrices are data transmitters, and are also known as set value storages. One of the many forms which the matrices may take is described in a German provisional Patent 1,153,420 relating to the structural arrangement of such storage device.

The ring core elements in the said German patent as well as in the invention herein are arranged in bars or brackets with the axes of the core elements parallel to one another in the row direction and passing through the bars perpendicular thereto so that threading of the information wires in a column direction is done through the central openings of the ring core elements (hereinafter called "cores" for simplicity), with the wires passing from bar to bar, etc. The call-up wires are threaded through the cores in the row direction, crosswise of the column direction, along the length of the bars. Since threading involves zeros and units, the bars require "zero" openings, one alongside of each core, so that the workman threading the information wire through the storage matrix will have the choice of 1 or 0 at each core location.

In the structure described in the said German patent, there is a zero opening displaced in a direction perpendicular to the longitudinal direction of the bars relative to each core so that when it is desired to thread a given column, the worker must move the bars perpendicular to their longitudinal direction. It is assumed, of course, that the bars are arranged with their faces parallel and all extending parallel one to the other. Since the call-up wires extend in the row direction, and the information wires extend in the column direction, the movement required of the bars in the structure of said German patent, in order to enable the information wires to be threaded through chosen zero and core openings, is perpendicular to both the column and row directions.

The invention is characterized by arranging the zero openings alongside of the core openings and aligned therewith in a row direction so that all that is necessary for the workman to do in threading the information wires is to shift the bar in the row direction. Accordingly, it is one of the principal objects of the invention to provide this arrangement in a data storage device using such cores, for advantages of compactness, simplicity in handling, and other advantages set forth hereinafter.

Another principal object of the present invention is to provide a shiftable bracket which is adapted to hold the cores to be threaded during the threading operation, and furthermore serve as a support means after said core-threading operation has been completed. Accordingly, the conducting wires need only perform a control function, for the bracket means provide the structural rigidity necessary to hold the cores in permanently fixed position.

Still another object of the invention is to provide shiftable support means that enable the facile threading of magnetic core memories with the use of conventional core-threading equipment.

Another object of the invention is to provide a structure of the character described in which the bars having the cores and zero openings are provided with slotted ends arranged to cooperate with spring-pressed means for retaining the bars in either of two positions. These positions are displaced one from the other by the distance between each core opening and its respective zero opening.

Still other objects of the invention include the provisoin of core threading apparatus in which movement of the bars mounting the cores is confined to rectilinear movement in the direction of the rows of cores; in which the resulting device is quicker to thread and results in shorter feed paths; and in which the structure is capable of being operated by remote control.

The foregoing and other objects of this invention will become apparent as the description of the invention proceeds. A preferred embodiment of the invention has been described in detail in the specification, and illustrated in the accompanying drawings. It is contemplated that variations in the specific structure described and illustrated may occur to the skilled artisan which are of such minor character as not to depart from the principles or sacrifice any of the advantages of the invention.

Figure 1:
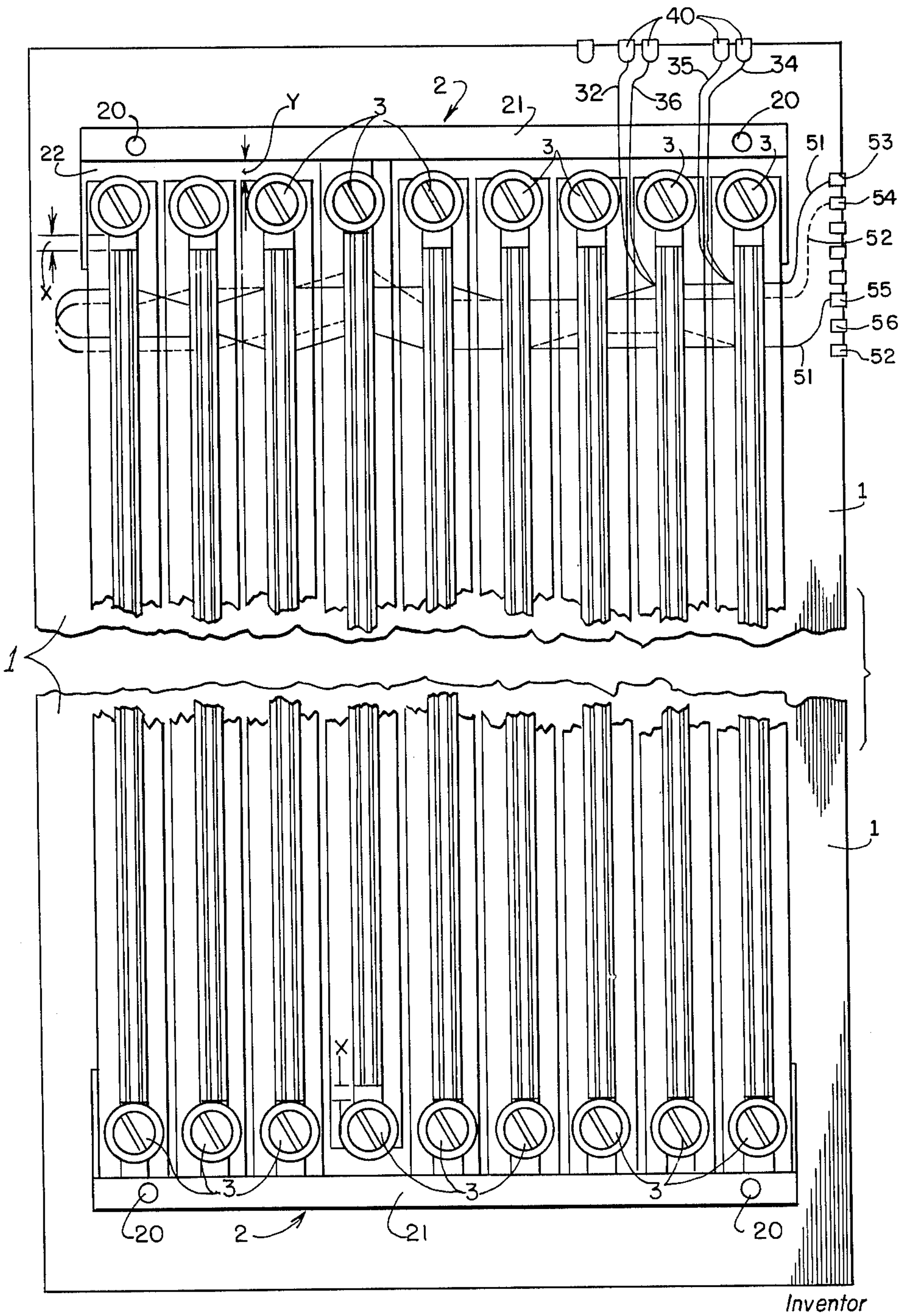
FIG. 1 is a top plan view of a mounting structure for cores constructed in accordance with the invention, having only a representative few of the information or call-up wires connected thereto.
Figure 2:
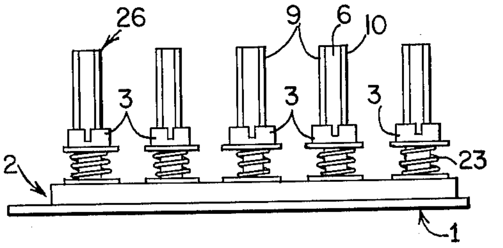
FIG. 2 is a fragmentary and elevational view of the mounting structure of FIG. 1.

The invention is characterized by the provision of a number of parallel bars or brackets in an assembly, in which cores are mounted suitably spaced along the length of the bars. The cores are secured with their horizontal axis parallel to the bars so that information wires may be threaded through a number of cores in a single transverse pass going through the core centers and thus through the bars. Zero holes are provided in the bars, each core having a zero hole spaced from it by a predetermined distance in a direction parallel with the length dimension of the bars. The bars are shiftable along their length by the same predetermined distance, so that for any given threading operation, the workman may align cores and zero holes in any desired order, and make a straight single pass with his threading needle.

In the drawings, the reference character 1 represents a base plate upon which are mounted the brackets or bars of the invention. This base plate may be of any form, for example a so-called card which has a control circuit or printed circuit on its bottom, and/or which may have electrical contacts along its edges to facilitate the attachment or connection of the wires which pass through the cores and zero holes in the bars. These will be explained in some detail hereinafter, for the base plate with the shiftable mounting structure and the selectively threaded cores will be inserted, in toto, into an intelligence network A pair of support members 2 are mounted to the surface of the plate 1 at opposite ends thereof, by means of screws 20 or other suitable fastening means. The support members are arranged parallel to and spaced from one another and may have a thickened portion 21 along the outer edge of each thereby giving rise to a seating surface 22 on each member 2. A plurality of posts 3 are provided along the length of the support members, these posts being in the form of screws threaded into suitable openings formed in the members 2. Each post 3 includes a spring 23 pressing down upon a washer 24 which in turn engages the tongues 25 which straddle each post 3 and are frictionally pressed against the seating surface 22. Nine such posts are shown along each member 2 aligned along the length of the respective members, and forming pairs of juxtaposed aligned posts, one of each pair being on the respective member.

Extending between each pair of posts 3, there is a bar or bracket 26 which is intended to have the ferrite cores mounted therein. Thus, there are nine such bars, each being formed of a central insulating layer 6 sandwiched between a pair of thin plies of insulating material shown at 9 and 10. The bars are arranged on one long edge, with their surfaces parallel to one another.

Figure 3:
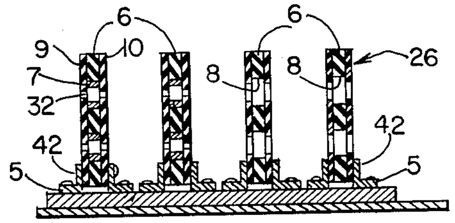
FIG. 3 is a composite sectional view, the right hand side being a sectional view taken through a pair of mounting bars generally along the line *a—a* of FIG. 4 and in the direction indicated; the left hand side being a sectional view taken generally along the line *b—b* of FIG. 4 and in the direction indicated.
Figure 4:
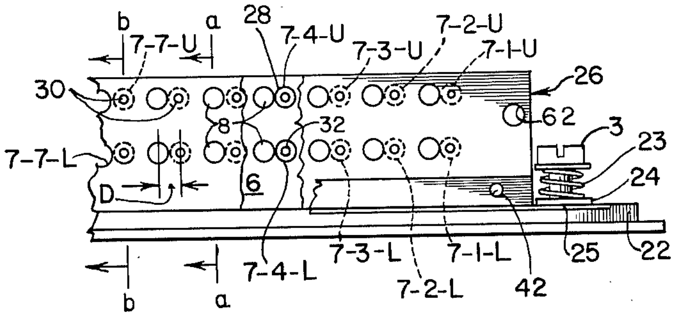
FIG. 4 is a fragmentary side elevational view of a mounting bar, with portions broken away to show the interior construction.
Figure 5:
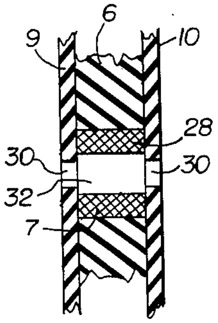
FIG. 5 is a fragmentary enlarged sectional view through a single ring core element mounted in a mounting bar.

Each bar has a plurality of cores 7 mounted therein in the manner best illustrated in FIGS. 3, 4 and 5. A large hole 28 is formed to receive each core 7 in the center layer 6 having a diameter substantially the same as the core so that the core firmly fits in the hole 28. The thickness of the layer 6 is chosen to be the axial length of the core. The outer plies 9 and 10 each have a passageway 30 formed therein, axially aligned with the bore 32 of the core 7, but slightly smaller in diameter, so that when wires are threaded through the passageways 30, the threading needle (not shown) will not damage the core.

In the embodiment shown there are two levels of cores, an upper and a lower. Looking at FIG. 4, for example, the notation of cores held in the bar may be designated as follows:

First core, upper level ---------- 7–1–U
First core, lower level ---------- 7–1–L
Second core, upper level ---------- 7–2–U
Second core, lower level ---------- 7–2–L
And so on.

Figure 6:
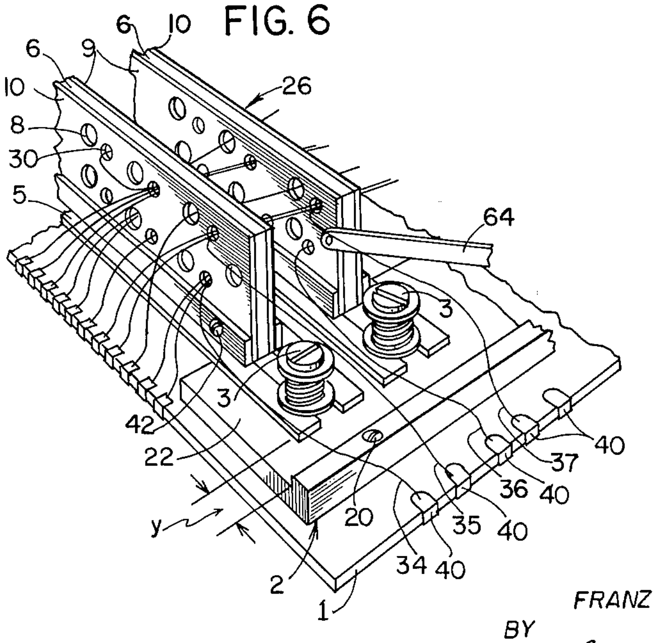
FIG. 6 is a fragmentary view of a corner of a core mounting structure to show the details thereof, some of the wires being connected thereto, and embodying a slightly modified form of the invention.

All of the cores which are mounted in the respective bars are threaded along the length of the bars, as for example by the call-up lines 34, 35, 36, 37, shown in FIGS. 1 and 6, these wires being normally present for all arrangements of the storage device, threading all cores. The base plate 1 may have end contacts as shown at 40 to enable these call-up wires to be connected into control circuits.

Alongside of each core there is a hole, designated 8 in the drawings, which passes completely through the bars. Note in FIG. 4 that a hole is spaced to the left of each of the passageways 30, with its axis and that of the core with which it is associated parallel. The distance between the axis of each core and its by-pass hole is a critical one, and as shown at the left in FIG. 4 is designated D. All such distances are precisely the same. The distance between the levels is the same throughout but is not critical for the operation of the device. Likewise, the distance between one core 7 and its neighbor in the same level is not critical, just so that there is enough room for the cores and holes.

The cores 7 are arranged in rows, considered along the length of each bar in a given level, and in columns, the latter being transverse of the bars. The axes of the cores in a given row are parellel, and the axes of the cores of a given column, assuming that all of the bars are prefectly aligned, are coincident. The invention contemplates a slight shifting of the axes of selected ones of the cores of a column by the distance D, but this will be explained below. For clarity, it will be appreciated that the wires 34, 35, 36 and 37 each thread a row of cores.

The purpose of the holes is to correspond to the bits designated 0 and the purpose of the cores is to correspond to bits designated 1. Obviously in threading a group of bits to form what my be termed a word or a number by the binary system, it will be necessary to by-pass cores in the threading process. According to the invention, it is a simple expedient merely to shift the bar in question lengthwise by the distance D.

Each bar has its layers secured together by means of angle members 5, held in place by screws 42, and the tongues 25 comprise extensions of the angle members 5. In effect, each pair of tongues is a bifurcated extension of the bottom of the bar to which said tongues are attached. There are tongues at each end of each bar 26, and the length of each bar is critical relative to its post 3. The total length of each bar end to end, not including its tongues 25, is shorter than the distance between the pair of posts 3 which engage its tongues by the distance X, as shown in FIG. 1. The distance X is chosen to be exactly equal to the distance D. Conveniently, the distance between the total ends of the respective bars, that is between the ends of the tongues 25 is less than the distance between the inner edges of the thickened portions 21 by the distance Y, and the distance Y chosen to be equal to the distance D. In the latter instance, the location of the posts 3 and the length of the tongues 25 is not critical so long as total movement of the bars is limited to the said distance Y. This latter type of structure is shown in FIG. 6. In the case that the posts serve as stop means, the thickened portions 21 are not needed, but the support members 21 may be simple strips of suitable material of rectangular cross-section.

The posts 3 may be tightened sufficiently to enable a workman easily to overcome the friction of the tongues 25 engaging the friction surfaces 22, or if desired the posts may be tightened to lock the bars in any given position.

To thread the bits of the grouping desired for any given column, the worman aligns the bars in accordance with whether the respective bars is to represent 0 or 1 and then passes his needle completely through the aligned openings, whether of the type 8 or 30. The number of bars need not correspond to the number of bits required, since it is feasible to thread one column from front to back on one level and then from back to front on the other level, with the bars adjusted in between these passes. The two emerging ends are thus close to one another, thereby simplifying the wiring. Likewise, the threading may be between adjacent columns.

For enabling one to understand the threading, consider the information wires 51 and 52 in FIG. 1, the first being shown solid and the second dashed. A number of information circuit contacts are shown at the side of the base plate 1, and the wire 51 extends between the contacts 53 and 55 while the wire 52 extends between the contacts 54 and 56. Assuming that the cores are closest to the upper end of the drawing and that the by-pass holes 8 are next alongside, and assuming further that the threading occupies only the first two upper level columns, it may be seen that the grouping of the information wire 51 represents the number (starting from right to left) 110010101 and then looping back to the next column (left to right) 110000000. It should be noted that since the fourth bar from the left has been shifted, its holes 8 align with the core passageways 30 of all other bars. This exemplary illustration merely shows how one bar may be shifted and is but one of the many possible arrangements of bars for threading the wires 51 and 52. The wire 52, as shown, represents the binary number 000001110001100110. Obviously, the apparatus can be used for groupings of fewer bits.

In retrospect, it will be appreciated that the threading of the storage device is effected by pushing the individual bars into one extreme position or the other, depending upon the information grouping to be threaded into the apparatus. The stop means are arranged so that a minimum of time is lost. Furthermore, in the threading operation, once the bars have been aligned, the threading needle passes directly through the appropriate holes. As seen in FIG. 4, the manner of threading a grouping of 18 bits would be to start through the column consisting of the cores 7–1–U and coming back through the cores 7–1–L or the cores 7–2–U. In either case, threading may be actually through the cores themselves or through the adjacent holes 8, depending upon the positions of the respective bars.

It will also be appreciated that the shiftable bars or brackets 26 are readily adapted for use with automated program-controlled core threading apparatus. For this purpose, each bracket is provided with an additional hole 62 situated at one end of the bracket, as seen in FIG. 6. The actuating means of the program control device (not shown) would provide one connecting member 64 for each bracket. These connecting members would sequentially set one bracket after another as the program advanced from row to row across the matrix. Suitable program control means for governing the operation of members 64 would include perforated tape and punched cards.

The base plate 1 with brackets 26 holding the cores 7 in fixed position is then inserted, in toto, into any conventional intelligence network. Brackets 26, therefore, serve a dual function as pointed out above.

Firstly, said brackets are selectively shiftable (either manually as seen in FIGS. 1–5 or automatically as seen in FIG. 6) into two positions in relation to the conventional threading apparatus. In the first position, or 1 position, the information wire passes directly through the centers of cores 7. In the second, or 0 position, which is usually the shifted position, the information wire passes through the by-pass opening 8 during the threading operation.

Secondly, after the selective threading operation has been completed, the brackets 26 maintain the cores 7 in either of their two primary positions. Therefore, brackets 26 provide additional support for cores 7, and relieve the threading or conducting wires of the function of supporting the cores. The magnetic memory unit so formed is manifestly stronger and easier to handle than the conventional storage devices which relied upon the information wires to support said cores.

The invention has been particularly pointed out in the claims hereto appended, it being intended that the language of the claims be construed broadly commensurate with the improvements in the arts and sciences engendered thereby.

I claim:

1. In a magnetic core memory device with toroidal magnetic cores arranged in a matrix with an X and a Y axis, the combination of:

(a) A plurality of insulated support brackets extending parallel to the Y-axis of the matrix, (b) said brackets having a first series of equally spaced openings extending through the brackets along the X-axis, (c) said openings being adapted to hold a magnetic core in fixed position therein, (d) said brackets having a second series of equally spaced by-pass openings extending through the brackets along the X-axis, (e) said second series of openings being arranged in alternative sequence with said first series of openings, (f) a mounting base for said plurality of support brackets, (g) a plurality of post means fixed to said base and extending along said base in the direction of the X-axis, (h) one of said plurality of post means being fixed to said base at each end of one of said support brackets, (i) said brackets having a tongue means at each end thereof said tongue means straddling said posts and cooperating therewith to permit shifting movement of said brackets relative to said base only in the direction of the Y-axis, (j) the extent of the shifting movement of said brackets permitted by said tongue means and post means connection being equal to the distance between an opening of said first series of openings and an adjacent opening of said second series of openings in said brackets.

2. In a magnetic core memory device with toroidal magnetic cores arranged in a supported matrix with a horizontal axis and a longitudinal axis, said matrix structure comprising:

(a) a plurality of insulated brackets extending parallel to one another along the longitudinal axis of said matrix, (b) a mounting base for said brackets, (c) a slot and pin connection at least at one end of each of said brackets, said connection permitting limited movement of said bracket relative to said base only in the longitudinal direction, (d) a first series of passageways extending along the longitudinal axis of each of said brackets, (e) each of said first series of passageways adapted to hold a magnetic core therein with the vertical axis of said core parallel to the longitudinal axis of said bracket, (f) a second series of by-pass passageways extending along the longitudinal axis of each of said brackets, (g) each passageway of said second series being disposed adjacent each one of said first series of passageways, (h) each one of said second series of passageways being spaced from an adjacent one of said first passageways by an equal distance, (i) and the extent of said movement of said bracket permitted by said pin and slot connection being equal to the distance from one passageway of said first series to the adjacent passageway of said second series.

3. The core memory of claim 2 in which each of said brackets has at least two identical, vertically spaced series of passageways.

4. The bracket of claim 2 in which said insulated brackets comprise a central layer sandwiched between a pair of thin plies of insulating material, said plies and said layer being held together by angle members.

5. The bracket of claim 4 in which the cores are adapted to be mounted in said central layer, the thickness of said central layer being equal to the axial length of the cores, and the diameter of said passageways in said central layer being greater than the diameters of said passageways in said outer layers.

6. The core-memory of claim 2 in which said slot and pin connection comprises a post means including a spring pressing down upon a washer which engages a tongue which straddles said post, said tongue being frictionally pressed against a seating surface formed by an L-shaped support member mounted to the surface of said base.

7. The slot and pin connection of claim 6 in which said post is a screw member, said screw member being threaded into said support member.

References Cited by the Examiner

UNITED STATES PATENTS

| | | | |
|---|---|---|---|
| 2,331,806 | 10/1943 | Shakespeare | 29—434 X |
| 2,696,064 | 12/1954 | Wolfe et al. | 29—434 X |
| 3,103,062 | 10/1963 | Himmelberger | 29—200 |
| 3,174,214 | 3/1965 | Davis | 29—203 |
| 3,183,579 | 5/1965 | Briggs et al. | 29—155.5 |

WHITMORE A. WILTZ, *Primary Examiner.*

THOMAS H. EAGER, *Examiner.*